US006621799B1

(12) United States Patent
Kemp et al.

(10) Patent No.: US 6,621,799 B1
(45) Date of Patent: Sep. 16, 2003

(54) SEMI-RELIABLE DATA TRANSPORT

(75) Inventors: Bradford H. Kemp, Salem, NH (US); Benjamin E. McCann, Acton, MA (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

(21) Appl. No.: 09/167,097

(22) Filed: Oct. 5, 1998

(51) Int. Cl.[7] ................................................. H04B 1/44
(52) U.S. Cl. ........................ 370/282; 370/236; 709/237
(58) Field of Search ................................. 709/203, 224, 709/230, 235, 237; 714/748; 380/212; 370/469, 236, 235, 216, 230, 229, 394, 389, 231, 248, 282

(56) References Cited

U.S. PATENT DOCUMENTS

| 5,553,083 A | | 9/1996 | Miller .......................... 714/748 |
| 5,745,685 A | * | 4/1998 | Kirchner et al. ............. 709/237 |
| 6,076,114 A | * | 6/2000 | Wesley ......................... 709/235 |
| 6,105,064 A | * | 8/2000 | Davis et al. .................. 709/224 |
| 6,273,622 B1 | * | 8/2001 | Ben-David ................... 709/230 |

OTHER PUBLICATIONS

Braden, R., "TCP Extensions for High Performance: An Update", Jun. 21, 1993.
Brakmo et al., "TCP Vegas: New Techniques for Congestion Detection and Avoidance", Dept. of Computer Science, University of Arizona, Tucson, AZ, 1996.
Brakmo et al., "TCP Vegas: End to End Congestion Avoidance on a Global Internet", Dept. of Computer Science, University of Arizona, Tucson, AZ.
Brakmo et al., "Performance Problems in BSD4.4 TCP", Dept. of Computer Science, University of Arizona, Tucson, AZ.

Fall et al., "Comparisons of Tahoe, Reno, and Sack TCP", Lawrence Berkeley National Laboratory, Berkeley, CA, Dec. 2, 1995.
Floyd, S., "TCP and Successive Fast Retransmits" Lawrence Berkeley Laboratory, Berkeley, CA, May 1995.
Floyd et al., "Increasing TCP's Initial Window", Jul. 1997.
Floyd S., "Issues of TCP with SACK", Mar. 9, 1996.
Hanks, S., "Generic Routing Encapsulation (GRE)", Oct. 1994.
Jacobson, V., "Re: interpacket arrival variance and mean", e–mail message, Jun. 15, 1987.
Jacobson, V., "Re: your congestion scheme", e–mail message, Nov. 1987.

(List continued on next page.)

Primary Examiner—Hassan Kizou
Assistant Examiner—John Pezzlo
(74) Attorney, Agent, or Firm—Fish & Richardson P.C.

(57) ABSTRACT

A new type of communication protocol provides semi-reliable transport of data over a data channel, such as over the Internet. The new type of protocol limits the number of retransmissions of unsuccessfully delivered data and may eventually "give up" on successfully delivering particular data and go on sending subsequent data to the destination. When a reliable communication protocol, such as TCP/IP is tunneled between two computers over a virtual connection which uses the new type of semi-reliable protocol, overall error control of data passing between the two computers involves elements of error control implemented by both the semi-reliable protocol and the reliable protocol. This overall error control can provide higher throughput than provided by using either a completely reliable protocol (e.g., TCP) for the virtual connection, or a completely unreliable protocol (e.g., UDP) for the virtual connection. This advantage can be even more pronounced if the data stream is compressed or encrypted before being passed over the virtual connection using a technique which maintains state from one data packet to another.

25 Claims, 14 Drawing Sheets

OTHER PUBLICATIONS

Jacobson, V., "Dynamic Congestion Avoidance/Control", e–mail message, Feb. 1988.

Jacobson, V., "TCP Extensions for Long–Delay Paths", Oct. 1988.

Jacobson, V., "Modified TCP Congestion Avoidance Algorithm", e–mail message, Apr. 1990.

Jacobson, V., "Design Changes to the Kernel Network Architecture for 4.4BSD", Lawrence Berkeley Laboratory, Berkeley, CA May 1992.

Jacobson, V., "Some Design Issues for High–Speed Networks", Lawrence Berkeley Laboratory, Berkeley, CA Nov. 1993.

Jacobson, V., "End2End", e–mail message, Mar. 1994.

Jacobson, V., "TCP Extensions for High Performance", e–mail message, Feb. 1997.

Mathis et al., "Forward Acknowledgement: Refining TCP Congestion Control", Pittsburgh Supercomputing Center.

Mathis et al., "TCP Rate–Halving with Bounding Parameters", Pittsburgh Supercomputing Center, Oct. 1996.

Mathis et al., "TCP Rate–Halving with Bounding Parameters", Pittsburgh Supercomputing Center, Oct. 1996.

Mathis et al., "TCP Selective Acknowledgement Options", e–mail message, Oct. 1996.

Meyer, G., "The PPP Encryption Control Protocol (ECP)", Spider Systems, e–mail message, Jun. 1996.

Partridge et al., "A Faster UDP", IEEE/ACM Trans. on Networking, Aug. 1993.

Rand, D., "The PPP Compression Control Protocol (CCP)", Novell, e–mail message, Jun. 1996.

Rizzo, L., "Issues in the implementation of selective acknowledgements for TCP", e–mail message, Jan. 1996.

Sharma et al., "Scalable Timers for Soft State Protocols", Information Sciences Institute, University of Southern California.

Simpson, W., "The Point–to–Point Protocol (PPP)", Daydreamer, Jul. 1994.

Stevens, W., "TCP Slow Start, Congestion Avoidance, Fast Retransmit, and Fast Recovery Algorithms", NOAO, Jan. 1997.

TCP Selective Acknowledgement option (and related changes) for FreeBSD, Sep. 1997.

Network Working Group Request for Comments: 1072, "TCP Extensions for Long–Delay Paths", Sep. 1997.

Ideal Congestion Control, Sep. 1997.

Marasli et al., "Partially Reliable Transport Service", *Proceedings, Second IEEE Symposium on Computers and Communications (Cat. No. 97TB100137), Proceedings Second IEEE Symposium on Computer and Communications, Alexandria, Egypt*, Jul. 1–3, 1997, pp. 648–656.

Marasli et al., "Retransmission–Based Partially Reliable Transport Service: An Analytic Model", *Proceedings of Infocom, US, Los Alamitos, IEEE Comp. Soc. Press*, vol. Conf. 15, 1996, pp. 621–629.

* cited by examiner

Receive Packet from PPP 310:

| | |
|---|---|
| 501 | IF Retransmit Queue 420 is not full THEN |
| 502 |     Transmit Packet |
| 503 | ELSE |
| 504 |     Notify PPP module 310 that the communication path is congested |
| 505 |     IF Write Queue 410 is not full THEN |
| 506 |         Save Packet in Write Queue 410 |
| 507 |     END IF |
| 508 | END IF |

FIG. 5

Transmit Packet:

| | |
|---|---|
| 601 | Append Packet to Retransmit Queue 420 |
| 602 | Build Header |
| 603 | Send Packet with Header to GRE Mux 330 |

FIG. 6

Build Header:

| | |
|---|---|
| 701 | IF Packet has a data payload THEN |
| 702 |     Record sequence number in Header sequence number field |
| 703 | END IF |
| 704 | IF *done_queued* 476 THEN |
| 705 |     Record *done* 478 in Header done field |
| 706 |     *done_queued* 476 = False |
| 707 | END IF |
| 708 | IF *sack_queued* 472 AND read queue 440 has entries THEN |
| 709 |     Record sequence numbers of packets in read queue 440 in |
| 710 |         Header sack field |
| 711 | END IF |
| 712 | *sack_queued* 472 = False |
| 713 | IF *ack_queued* 470 THEN |
| 714 |     Record *ack* 474 in Header ack field |
| 715 |     *ack_queued* 470 = false |
| 716 | END IF |

FIG. 7

Receive Packet from GRE Mux 330:

| | |
|---|---|
| 801 | Process Received Header |
| 802 | IF Received Packet has a data payload THEN |
| 803 |     Process Received Payload |
| 804 | END IF |
| 805 | IF the Received Header has a sack THEN |
| 806 |     Process retransmit queue 420 |
| 807 | ENDIF |
| 808 | IF the Received Header has an ack THEN |
| 809 |     Process write queue 410 |
| 810 | ENDIF |
| 811 | Process Pending acks and sacks |

FIG. 8

Process Received Header:

| | |
|---|---|
| 901 | IF Header has a done field THEN |
| 902 | Send packets in read queue 440 with sequence numbers less than or |
| 903 | equal to done field to PPP module 310 |
| 904 | *ack_queued* 470 = True |
| 905 | *ack* 474 = later of done field and current value of *ack* 474 |
| 906 | END IF |
| 907 | IF Header has a sack field THEN |
| 908 | Reduce cwnd 430 |
| 909 | LOOP over sacked packets in retransmit queue 420 DO |
| 910 | Mark packet for no further retransmissions |
| 911 | END LOOP |
| 912 | *done_queued* 476 = True |
| 913 | END IF |
| 914 | IF Header has an ack field THEN |
| 915 | Increase cwnd 430 |
| 916 | Remove packets with sequence numbers less than or equal |
| 917 | to ack field from retransmit queue 420 |
| 918 | *done* 478 = later of ack field and current value of *done* 478 |
| 919 | IF retransmit queue 422 is empty THEN |
| 920 | *done_queued* 476 = False |
| 921 | END IF |
| 922 | END IF |

FIG. 9

Process Received Payload:

| | |
|---|---|
| 1001 | IF packet is a duplicate packet THEN |
| 1002 |     Discard the payload |
| 1003 | ELSE |
| 1004 |     Insert packet into read queue 440 |
| 1005 |     IF inserted packet is not the latest sequence number in queue THEN |
| 1006 |         *ack_queued* 470 = True |
| 1007 |     END IF |
| 1008 | END IF |
| 1009 | LOOP over earliest in-sequence packets in read queue 440 DO |
| 1010 |     Send packet to PPP module 310 |
| 1011 |     Increment *ack* 474 |
| 1012 |     *ack_queued* 470 = True |
| 1013 | END LOOP |
| 1014 | IF there are any remaining packets in read queue 440 THEN |
| 1015 |     IF a sack has not been sent in the last RTT interval THEN |
| 1016 |         *sack_queued* 472 = True |
| 1017 |     END IF |
| 1018 | END IF |

FIG. 10

Process Retransmit Queue 420:

| | |
|---|---|
| 1101 | LOOP over first cwnd 430 packets in retransmit queue 420 DO |
| 1102 |     IF packet is a candidate for retransmission THEN |
| 1103 |         Increment number of retries for packet |
| 1104 |         Build Header |
| 1105 |         Send packet with header to GRE Mux 330 |
| 1106 |     END IF |
| 1107 | END LOOP |
| 1108 | IF no packets were retransmitted THEN |
| 1109 |     *done_queued* 476 = True |
| 1110 |     Build Header |
| 1111 |     Send packet with header but no payload to GRE Mux 330 |
| 1112 | END IF |

FIG. 11

Process Write Queue 410:

| | |
|---|---|
| 1201 | IF there are any packets in write queue 410 THEN |
| 1202 |     Transmit next packet in write queue 410 |
| 1203 |     IF retransmit queue 422 still has less than cwnd 430 packets THEN |
| 1204 |         LOOP UNTIL transmit queue 422 is full DO |
| 1205 |             Transmit next packet in write queue 410 |
| 1206 |         END LOOP |
| 1207 |     END IF |
| 1208 | END IF |
| 1209 | IF retransmit queue has less than 1/2 cwnd 430 THEN |
| 1210 |     Notify PPP module 310 than channel is decongested |
| 1211 | END IF |

FIG. 12

Process Pending acks and sacks:

| | |
|---|---|
| 1301 | IF sack_queued 472 THEN |
| 1302 | Build Header |
| 1303 | Send packet with header but no payload to GRE Mux 330 |
| 1304 | END IF |
| 1305 | IF ack_queued 474 AND ack_queued was True before the latest packet |
| 1306 | was received THEN |
| 1307 | Build Header |
| 1308 | Send packet with header but no payload to GRE Mux 330 |
| 1309 | ELSE |
| 1310 | Update ack timer 460 |
| 1311 | END IF |

FIG. 13

Ack timer 460 Expires:

1401    Build Header

1402    Send packet with header but no payload to GRE Mux 330

1403    Reset ack timer 460

FIG. 14

ATO timer 450 Expires:

1501    Process retransmit queue 420

1502    IF no packets were sent from retransmit queue 420 THEN

1503            Clear retransmit queue 420

1504    END IF

FIG. 15

SEMI-RELIABLE DATA TRANSPORT

BACKGROUND

This invention relates data transport over a data channel.

Data is typically transported over a data channel, such as over a data network, using a combination of communication protocols. For instance, on the Internet, data is sent between computers coupled to the Internet according to the Internet Protocol (IP), a "network layer" protocol. A communication session between software, such as two applications, executing on different computers typically uses a transport layer protocol to pass data between the computers. Two transport layer protocols used on the Internet are the Transport Control Protocol (TCP) and the User Datagram Protocol (UDP). Both these protocols are layered on IP to pass data between computers.

The TCP protocol provides reliable and in-sequence delivery of data from one computer to another. Based on acknowledgements sent back from a receiving computer, the sending computer retransmits data if needed. The UDP protocol, on the other hand, does not provide reliable or in-sequence delivery of data.

Communication passing between two computers according to a network layer communication protocol, such as IP or IPX, can pass between the computers over a virtual connection rather than over a physical connection in a technique known as "tunneling." The virtual connection itself uses a transport layer protocol and IP to communicate over the Internet. The original network layer data streams that are passed between them can be compressed and encrypted before being passed over the virtual connection.

SUMMARY

According to a general aspect of the invention, a new type of communication protocol provides semi-reliable transport of data over a data channel, such as over the Internet. Unlike transport layer protocols, such as TCP, in which data is retransmitted from a source computer to a destination computer until it is successfully delivered to and acknowledged by the destination computer, the new type of protocol limits the number of retransmissions and may eventually "give up" on successfully delivering particular data and go on sending subsequent data to the destination. On the other hand, unlike transport layer protocols, such as UDP, in which data is not retransmitted if it is not successfully delivered, the new type of communication protocol provides error control using limited numbers of retransmissions.

When a reliable communication protocol, such as TCP/IP is tunneled between two computers over a virtual connection which uses the new type of semi-reliable protocol, overall error control of data passing between the two computers involves elements of error control implemented by both the semi-reliable protocol and the reliable protocol. Advantages of this overall error control can include higher throughput than is provided by using either a completely reliable protocol (e.g., TCP) for the virtual connection, or a completely unreliable protocol (e.g., UDP) for the virtual connection. This advantage can be even more pronounced if the data stream is compressed or encrypted before being passed over the virtual connection using a technique which maintains state from one data packet to another.

In general, in one aspect, the invention is a method for communicating between a first software module, such as an application or a communication module or driver, on a first computer and a second software module on a second computer over a data channel. The data channel can pass over a data network such as the Internet. The method involves establishing a communication session, for instance at a transport layer, coupling the first software module and the second software module over the data channel. The method then includes sending outbound data from the first software module to the second software module over the communication session. Sending this outbound data includes transmitting a first packet that includes the outbound data from the first computer to the second computer. Prior to receiving an indication from the second computer that the first packet was successfully received, such as an acknowledgement of the first packet or of a set of packets including the first packet, the method includes transmitting a second packet that includes the outbound data (that is, retransmitting the outbound data) from the first computer to the second computer. Prior to receiving an indication from the second computer that the second packet was successfully received, the method includes transmitting a third packet that includes an indication, for example, in the header of the third packet, that indicates that the outbound data will not be further transmitted from the first computer to the second computer.

The method can further involve receiving inbound data at the first software module over the communication session from the second software module. Receiving the inbound data then includes receiving a first packet from the second computer that includes the inbound data, buffering the inbound data, and waiting for receipt of a packet from the second computer that includes prior inbound data that was sent by the second computer prior to sending the inbound data. The method then includes receiving a second packet from the second computer that includes an indication that prior inbound data will not be retransmitted by the second computer, and providing the inbound data to the first software module.

Preferred embodiments of the invention include one or more of the following features.

The first software module and the second software module implement a network layer protocol over a data network.

The first and second software modules implement a network layer protocol and the outbound data includes network layer communication. For instance, the first and second software modules can tunnel network layer communication over the communication session between the computers.

The method includes sending at least one additional packet that includes the outbound data (that is, retransmitting the outbound data) prior to transmitting the third packet.

The first software module implements a state-dependent data processing algorithm, such as a compression or an encryption algorithm, in which data processing of the outbound data depends on outbound data that was previously sent from the first software module to the second software module.

In general, in another aspect, the invention is a method for passing data over a data channel from a source to a destination. The method includes transmitting a first data packet from the source to the destination, retransmitting the first data packet from the source to the destination, and sending from the source to the destination an indication that the first data packet will not be further retransmitted. Sending the indication that the first data packet will not be further retransmitted can include transmitting a second data packet from the source to the destination which includes the indication that the first data packet will not be further retransmitted, for instance, in the header of the second data packet.

Preferred embodiments of the invention can further include, subsequent to transmitting the first data packet, transmitting a second data packet from the source to the destination, and prior to retransmitting the first data packet, accepting an indication that the second data packet was received at the destination prior to the first data packet being received at the destination.

In general, in another aspect, the invention is a method for passing data over a data channel from a source to a destination. The method includes receiving a first packet from the source that includes the data, and buffering the data, while waiting for receipt of a packet from the source that includes prior data that was sent by the source prior to sending the data. The method then includes receiving a second packet from the source that includes an indication that prior data will not be retransmitted by the source and then providing the buffered inbound data to the destination.

In general, in another aspect, the invention is a data communication module for passing data between a first computer and a second computer over a data channel. The communication module includes a retransmission storage, such as a queue, and a retransmitter coupled to the retransmission storage. The retransmission storage holds information related to a set of packets previously transmitted from the first computer to the second computer. The storage related to each of the packets includes a retransmission counter used to determine whether the packet is a candidate for retransmission to the second computer. The retransmission counter is updated when the packet is retransmitted. The retransmitter processes packets in the retransmission storage, including retransmitting a packet to the second computer if its associated retransmission counter indicates that the packet is a candidate for retransmission, and sending an indication that a packet whose counter indicates that it is not a candidate for retransmission.

Other features and advantages of the invention will be apparent from the following description, and from the claims.

DESCRIPTION OF DRAWINGS

FIG. 5 is a pseudocode listing of a procedure used to process an outbound packet;

FIG. 6 is a.pseudocode listing of a procedure used to transmit a packet;

FIG. 7 is a pseudocode listing of a procedure used to build a header for an outbound packet;

FIG. 8 is a pseudocode listing of a procedure used to process an inbound packet;

FIG. 9 is a pseudocode listing of a procedure used to process the header of an inbound packet;

FIG. 10 is a pseudocode listing of a procedure used to process the payload of an inbound packet;

FIG. 11 is a pseudocode listing of a procedure used to process packets in the retransmit queue;

FIG. 12 is a pseudocode listing of a procedure used to process packets in the write queue;

FIG. 13 is a pseudocode listing of a procedure used to process pending acknowledgments and selective acknowledgments;

FIG. 14 is a pseudocode listing of a procedure executed when the acknowledgment timer expires;

FIG. 15 is a pseudocode listing of a procedure executed when the adaptive timeout timer expires.

DESCRIPTION

Figure 1:
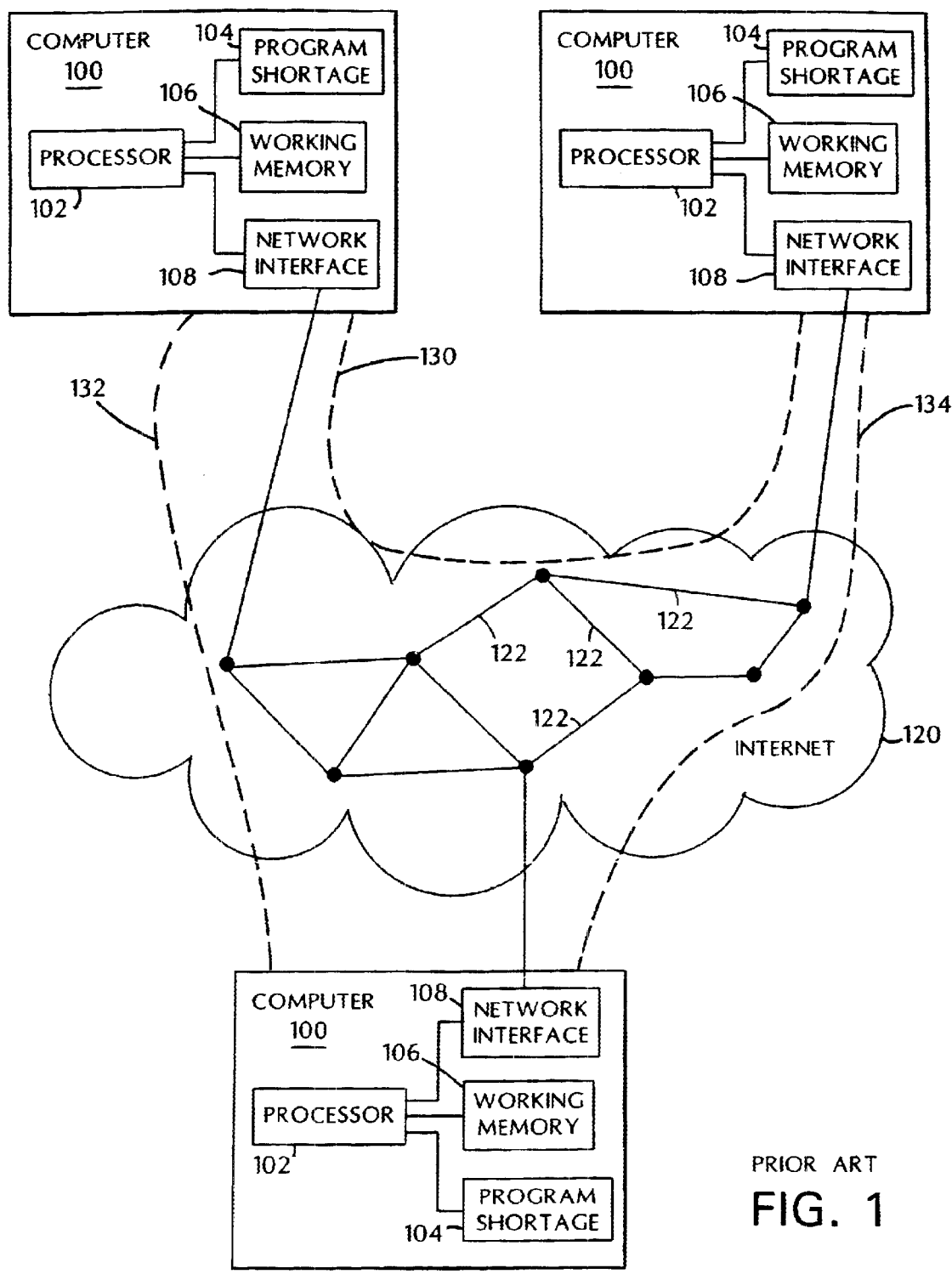
FIG. 1 illustrates several computers interconnected through the Internet.

1 System Overview (FIG. 1)

Referring to FIG. 1, multiple computers 100 communicate with one another over the Internet 120, a packet switched data network. Each computer 100 includes a network interface 108 through which the computer makes a physical communication path to the Internet. A variety of types of network interfaces 108 can be used depending on the type of physical connection used, including, for example, a modem to make a communication path over a dialed telephone connection. Each computer 100 also includes a processor 102 and program storage 104, which provides a static storage for the software that implements the applications and software modules described below. Each computer also includes working memory 106, which is used while executing the applications and software modules.

Computers 100 can send data to one another over Internet 120 using the Internet Protocol (IP). IP is a network layer protocol, which provides an addressing capability that is used to route individual packets from one computer 100 to another. The packets generally travel through multiple communication links 122 that make up Internet 120, being routed from link to link according to the destination address included in each packet.

Pairs of computers 100 can also communicate by first setting up a connection (e.g., a transport layer communication session) over Internet 120 and then using this connection as if they were a physical connection (i.e., a direct link) between the computers. Communication links 130, 132, and 134 illustrate such connections. Such connections are often known as communication "tunnels." In the system described below, communication tunnels are used to pass IP packets from one computer to another encapsulated in other packets that are used to send data over the tunnel connection. Network protocols other than IP, such as IPX, can alternatively, or concurrently, be sent through such a communication tunnel.

In this embodiment each computer encapsulates IP packets for transmission through a communication tunnel according to the standard Point-to-Point Protocol (PPP). A description of PPP can be found in Internet Request for Comments (RFC) 1661. Other encapsulation protocols can alternatively be used.

After encapsulating the IP packets in a PPP data stream, the computer sends the resulting PPP data stream using an extension of the standard GRE transport layer protocol (RFC 1701). The computer passes the packets of the GRE data stream over the Internet using the IP network layer protocol.

PPP includes the capability to compress and encrypt each packet it processes. For instance, RFC 1962 and 1968 describe such capabilities. PPP's compression and encryption can operate in what is known as a "stateless" mode, or alternatively in a "stateful" mode. In stateless compression or encryption, each packet is treated separately without requiring that the receiver of the compressed or encrypted packets rely on the sequence of prior packets to process a received packet. The stateless mode is tolerant of data loss on the PPP data stream; if the data for a packet is lost of damaged, subsequent packets can be processed despite the missing packet.

In "stateful" compression and encryption, the compression or encryption of one packet generally depends on prior packets and thereby may achieve a higher compression factor or faster encryption than would stateless compression and encryption. In order to process a received packet, the receiver of the packet must first process each packet in the sequence of packets from an initial reset state (e.g., at the initiation of the communication session) up to an including the received packet. If a packet is lost or damaged, the PPP protocol supports a resynchronization procedure. In PPP's resynchronization procedure the receiver of PPP communication requests that the transmitter reset its state. Compression and encryption of packets sent after the reset do not depend on packets sent before the reset. Therefore, the lost packets are then not required for processing packets that will be sent after the transmitter resets its state.

Many transport layer protocols used for communication on the Internet, including TCP and GRE, send multiple packets without requiring an acknowledgment in a "sliding window" technique. Using this technique, many packets can be "in flight," thereby providing a higher communication rate than if an acknowledgment of each packet must be received by the transmitting computer before it sends the next packet. PPP's resynchronization procedure can incur a significant performance penalty since the packets sent after the lost packet but before the reset cannot be processed by the receiver. Due at least in part to this performance penalty, PPP is typically used in prior systems with stateless compression and encryption when communicating through a tunnel over the Internet. In this system, however, PPP is used with stateful compression and encryption.

Although the system described below uses IP and communication over the Internet, alternative versions of the system could use other data networks and other network layer protocols. Similarly, alternatives to PPP can be used to encapsulate network layer protocols for transmission over the data network.

Figure 2:
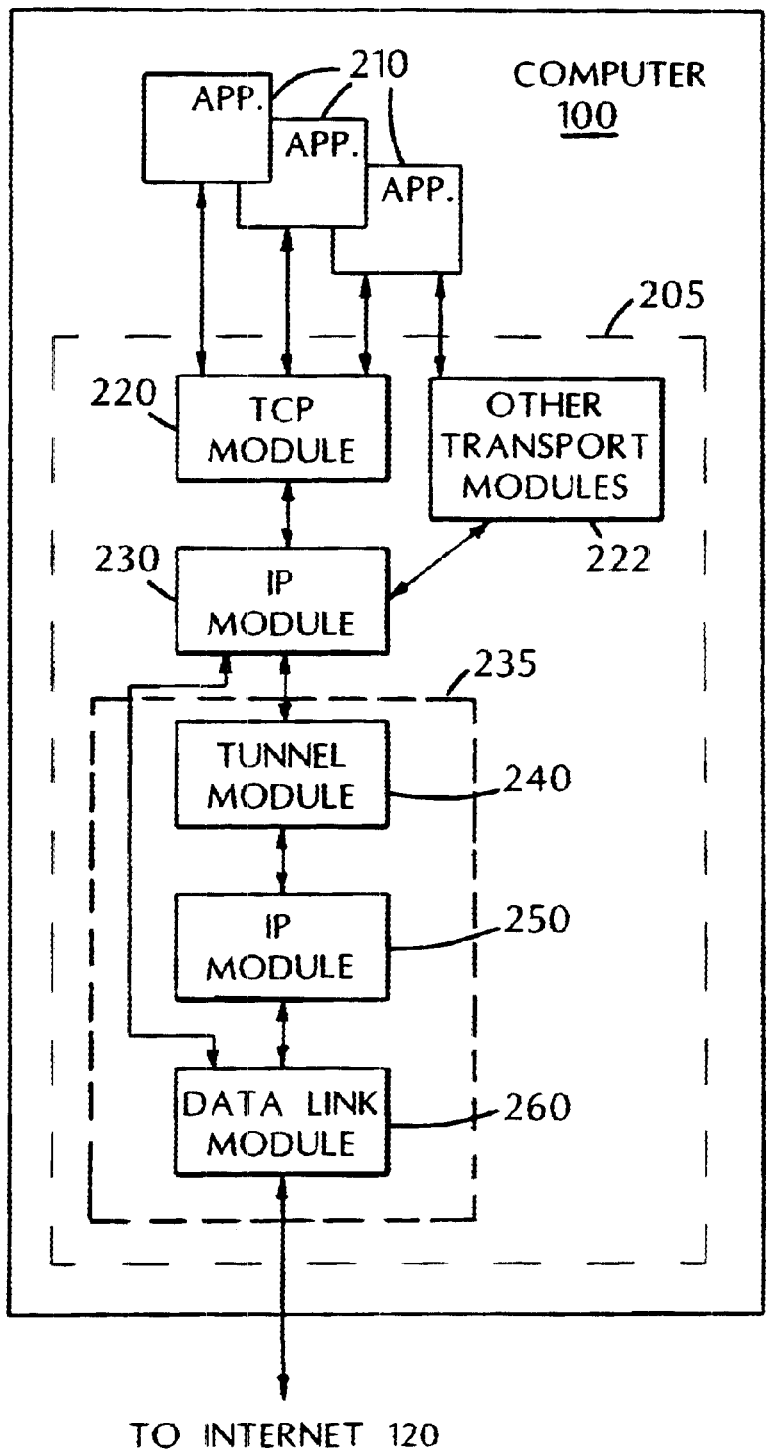
FIG. 2 illustrates software modules, including applications and a protocol stack, which execute on a computer.
Figure 3:
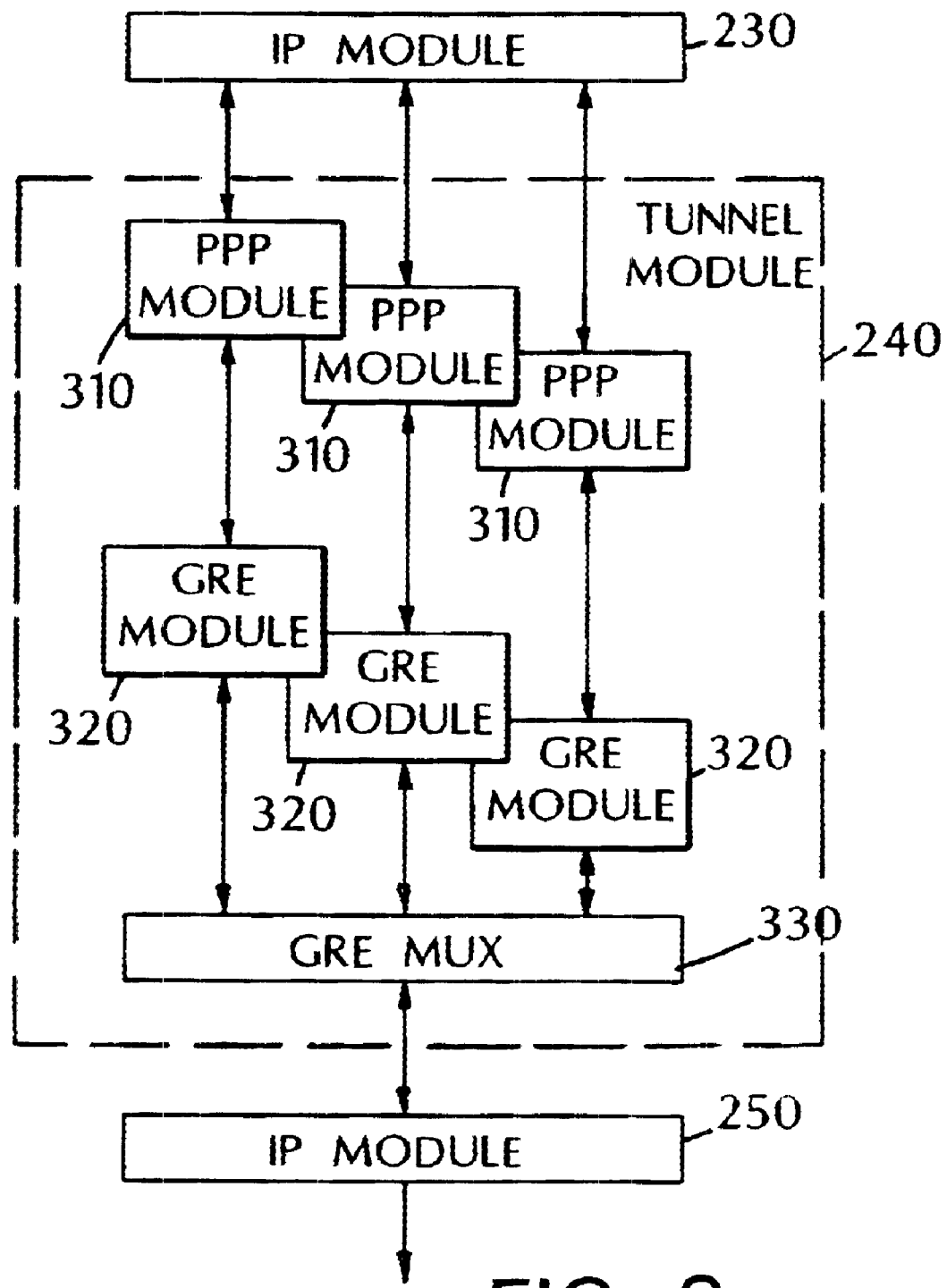
FIG. 3 illustrates elements of a tunnel module which is part of the protocol stack executing on a computer.
Figure 4:
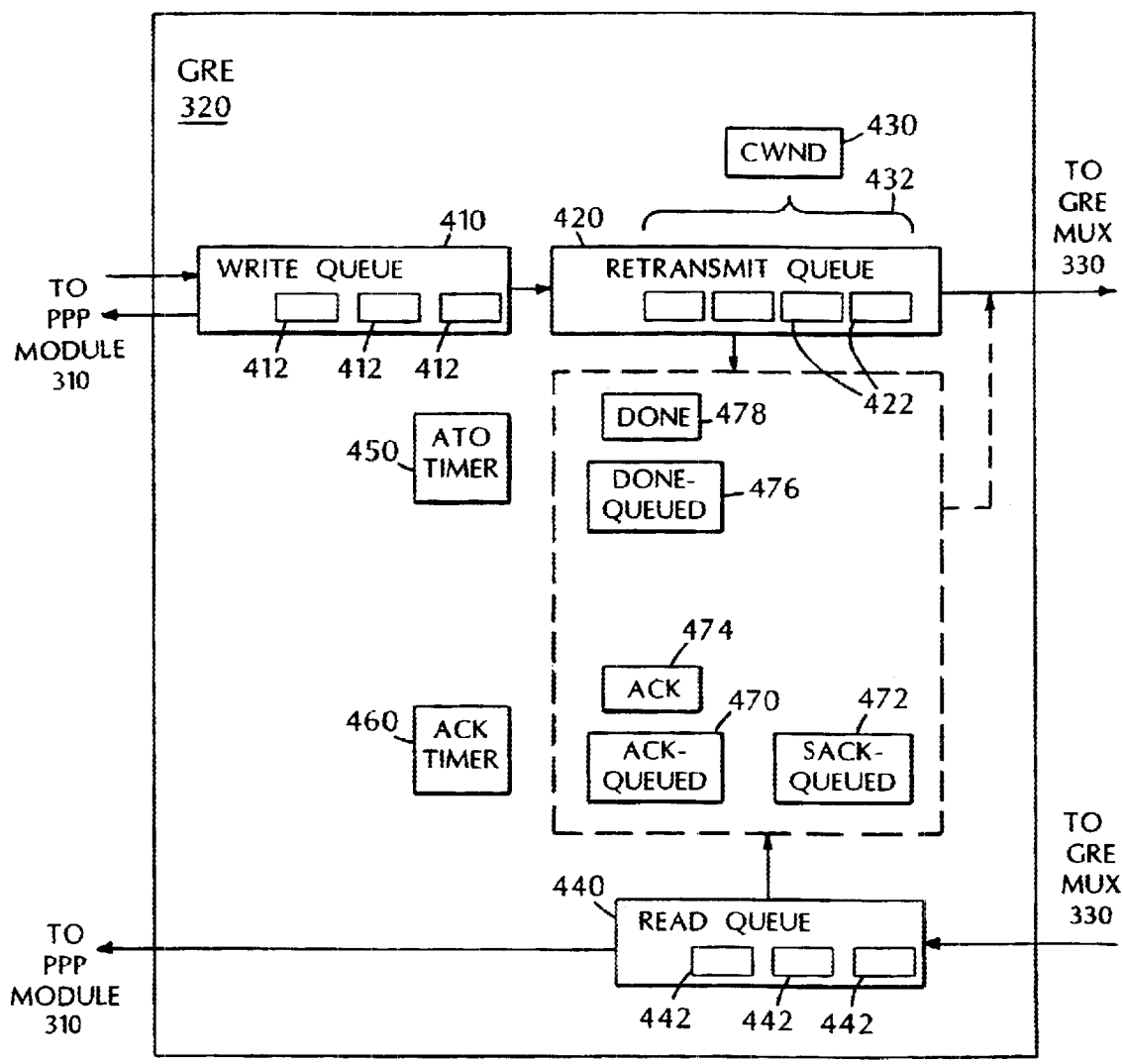
FIG. 4 illustrates elements of a transport layer module that is part of the tunnel module.

2 Software Architecture (FIGS. 2–4)

Referring to FIG. 2, multiple interacting software modules execute on each computer 100. One or more applications 210 on one computer 100 communicate with applications on other computers across Internet 120. A layered set of communication modules on computer 100 forms a protocol stack 205, which implements the overall communication protocol used to communicate between the computers. Applications 210 on two different computers 100 communicate over a path that includes protocol stack 205 at one computer 100, Internet 120, and protocol stack 205 on the other computer 100.

At the "top" layer of protocol stack 205, applications 210, in general, communicate with a transport layer module, such as TCP module 220, or one of an variety of other transport modules 222, in order to communicate over the Internet. TCP module 220 and other transport modules 222 in turn communicate with IP module 230 which provides network layer services to the transport layer modules. IP module 230 can pass data directly to a data link module 260, which provides low-level services for communication with other computers 100 over Internet 120. Addressing information provided by IP module 230 is used to direct each data packet from link to link on Internet 120 to reach an appropriate destination computer 100.

When an application 210 sends data using TCP/IP over Internet 120 to a destination application 210 on another computer, it first passes the data to TCP module 220. TCP module 220 passes the data to IP module 230 as a series of data packets. When a tunnel does not couple the computers, IP module 230 then passes each data packet, which includes its destination addressing information, to data link module 260. Data link module 260 passes the data packet with its destination address onto Internet 120. The addressing information in the packet is used to direct the packet over Internet 120 to the destination computer, where it passes from a data link module 260, to an IP module 230, then to a TCP module 220 and finally to a destination application 210. At the sending computer, TCP module 220 determines whether data it sent was correctly received by the receiving TCP module 220 based on acknowledgments returned from the receiving TCP module 220. If necessary, the sending TCP module 220 retransmits lost or corrupted packets.

Rather than sending data directly from IP module 230 to data link module 260 and then to Internet 120, a tunnel connection can be established between two computers 100. Two IP modules 230, one on each computer then communicate with one another as if the tunnel connection were a physical connection. In particular, at the sending computer 100, IP module 230 communicates with a combination of modules 235, which together provide data link layer services to IP module 230. In this combination of modules 235, a tunnel module 240 provides data link layer services to IP module 230. Tunnel module 240 establishes transport layer connections to one or more tunnel modules on other computers using the services of IP module 250. IP module 250 in turn uses the data link layer services of data link module 260. On a particular computer 100, IP module 250 can be a separate from IP module 230 (i.e., a separate instance), or can be part of a single software module, which implements the functionality of both IP module 230 and IP module 250.

Referring to FIG. 3, tunnel module 240 includes a number of PPP modules 310, or equivalently, logical instances of a single software module. Each PPP module 310 provides physical layer services to IP module 230 for communication with a single corresponding PPP module 310 on a remote computer. That is, in general, one PPP module 310 is used for each tunnel to a remote computer 100 to which computer 100 has a tunnel connection. PPP module 310 processes inbound and outbound data communication, and can optionally provide compression and encryption services for the data streams.

Each PPP module 310 uses the transport layer services of a corresponding GRE module 320 to communicate with the PPP module at the remote computer. Each GRE module 320 maintains a single communication session with a corresponding GRE module on the remote computer.

One or more GRE modules 320 on a computer communicate with a single GRE Mux 330 on that computer. A GRE module 320 provides outbound data packets to GRE Mux 330 which in turn passes them to IP module 250 for transmission to the remote computer. Inbound packets are received by IP module 250 which passes packets received from Internet 120 to GRE Mux 330 when the inbound packets identify the protocol used to be "GRE." GRE Mux 330 identifies the particular session to which each inbound packet belongs, and passes it to the appropriate GRE module 320.

Referring to FIG. 4, each GRE module 320 has several internal elements. These elements include registers, which store values associated with the state of the communication session, and inbound and outbound data queues used to store data and related information. On the outbound data path, data packets received from PPP module 310 pass directly to a retransmit queue 420 if they can be immediately transmitted according to the state of the GRE communication session. If the data that is accepted from PPP module 310 cannot be immediately transmitted, GRE module 320 buffers the data in a write queue 410. For instance, GRE module 320 can accept data even when the number of outstanding transmitted packets is limited by the size of the congestion window (stored in cwnd 430).

Retransmit queue 420 holds data packets 422 that GRE module 320 has transmitted, but that have not yet been acknowledged by the receiving GRE module 320. That is, retransmit queue 420 holds packets that have not yet themselves been acknowledged or that were transmitted after some other packet that has not yet been acknowledged. GRE module 320 stores information related to the transmissions of the packets, including the last transmission time and the number of transmission retries, along with the data for these packets.

On the inbound data path, when GRE module 320 receives a packet from GRE Mux 330, it either passes the packet directly to PPP module 310, or it buffers the packet in a read queue 440. For instance, GRE module 320 buffers a received packet if it is received out of order.

Referring still to FIG. 4, GRE module 320 stores and updates a congestion window size, cwnd 430, based on the history of transmissions and acknowledgments. The size of the congestion window determines how many packets can be in flight from the transmitting to the receiving GRE module. The congestion window size corresponds to the maximum length 432 to which retransmit queue 420 is permitted to grow. GRE module 320 adjusts the size of the congestion window using a well known congestion control approach which, in general, reduces the size of the window when packets are lost and increases the size until a maximum size is reached when packets are delivered successfully. Note that in certain circumstances, window size 430 may be reduced after packets enter retransmit queue 420, therefore at times, retransmit queue 420 may have more packets pending than the congestion window size.

GRE module 320 assigns sequence numbers to packets as they are transmitted. GRE module 320 includes a register done 478, in which it stores the highest sequence number of packets that it will not retransmit. GRE module 320 at times (described below) sends the stored done 478 the remote GRE module 320. A boolean flag, done_queued 476, indicates whether the stored done 478 is to be sent by GRE module 320 to the remote GRE 320 so that the remote GRE 320 does not continue waiting for retransmissions of packets with sequence numbers less than or equal to done 478.

GRE module 320 also stores ack 474. The value of ack 474 is the highest sequence number of packets such that for that and each prior packet, it has either received the packet successfully from the remote GRE module 320, or that it has explicitly "given up" on the packet due to the remote GRE module 320 having sent a done message indicating that it will not retransmit the packet. Ack_queued 470 indicates that the value of ack 474 should be sent to the remote GRE 320 as an acknowledgment of the received packets.

In general, packets are not specially sent to transmit an ack value. Instead, when possible, the acknowledgment is piggybacked on an outbound data packet. GRE module 320 maintains an ack timer 460 to track the time an acknowledgment has been pending but not sent. If this period is too long, then GRE module 320 sends a packet to the remote GRE 320 to transport the ack value.

GRE module 320 also sends "selective" acknowledgments. A selective acknowledgment lets the remote GRE module 320 know that particular packets have been received if those packets cannot be acknowledged due to there being a gap in the sequence numbers prior to the received packets. GRE module 320 includes sack_queued 472, a boolean flag that indicates that a selective acknowledgment should be sent to the remote GRE 320 in response to receiving an out-of-order inbound packet.

Referring still to FIG. 4, on the inbound data path of GRE module 320, a read queue 440 holds data packets 442 that have been received from a remote GRE module 320 via GRE Mux 330 but that have not yet been delivered to PPP module 310. In general, packets are sent to PPP module 310 with consecutive sequence numbers. Thus, when GRE module 320 receives a packet out of order and missing one or more packets that it still expects to receive, it does not immediately send the packet to PPP module 310 but rather stores the received packets in read queue 440. The out-of-order packets are not sent to PPP module 310 until GRE module 320 either receives all the intervening packets from the remote (sending) GRE module, or it receives explicit indications from the remote GRE module that no further attempts will be made to send the packet. This notification is in the form of a "done message" that is received in the header of an inbound packet.

As described above, GRE module 320 transmits data in response to receiving data from PPP module 310 and in response to ack timer 460. In addition, GRE module 320 also uses an adaptive timeout (ATO) timer 450 to initiate retransmissions of data in retransmit queue 420 when no acknowledgment or selective acknowledgment is received for a packet within a defined maximum interval from when it was last transmitted.

3 System Operation (FIGS. 5–16)

In general, each GRE module 320 provides a "semi-reliable" bi-directional transport layer communication path to a corresponding GRE module 320 on another computer. A pair of GRE modules 320 implements an extended version of the standard Generic Routing Encapsulation (GRE) protocol (see RFC 1701). This extended version of the protocol provides generally in-sequence delivery of data packets. The GRE modules attempt to provide successful delivery of packets by performing a limited number of retransmissions, but does not guarantee successful delivery. After a configured number of retransmissions, the sending GRE module "gives up" if it has not received an acknowledgment for that packet and notifies the receiving GRE module that the packet will no longer be retransmitted. Therefore, a packet sequence provided by a GRE module 320 to PPP module 310 (or any other module that uses the transport layer services of GRE module 320) includes generally consecutive packets, but may have sequences of missing packets.

Detailed operation of GRE 320 (FIG. 4) can be understood with reference to the pseudocode shown in FIGS. 5–15. This pseudocode illustrates the procedures followed by GRE module 320 in response to (a) receiving a packet from PPP module 310 (FIG. 5), (b) receiving a packet from GRE Mux 330 (FIG. 8), and (c) expiration of ack timer 460 or ATO timer 450 (FIGS. 14 and 15 respectively). These procedures reference elements of GRE module 320 shown in FIG. 4.

3.1 Receiving Data from PPP Module 310 (FIGS. 5–7)

Referring to the pseudocode in FIG. 5, when GRE module 320 receives a data packet from PPP module 310, it attempts to process the received packet. If its retransmit queue 420 is not full (line 501), that is, the number of entries 422 in retransmit queue 420 is less than or equal to the current congestion window size cwnd 430, then GRE module 320 sends the data to GRE Mux 330 (line 502) using a procedure shown in FIG. 6.

If retransmit queue 420 is full, GRE module 320 notifies PPP module 310 that the communication path is congested (line 504). PPP module 310 should suspend sending data to GRE module 320 until GRE module 320 indicates that the path is decongested, although in practice PPP module 310 does not always respond immediately to the notification and continues sending data. If write queue 410 is not full, then GRE module 320 queues the data passed from PPP module 0310 in write queue 410 for later transmission (line 506). Write queue 410 allows PPP module 310 to exceed the congestion window somewhat without loosing data. However, if write queue 410 is full, then GRE module 320 does not store the data received from PPP module 310 and the data is lost.

The procedure by which GRE module 320 transmits a packet (e.g., line 502 in FIG. 5) is shown in FIG. 6. The procedure involves GRE module 320 creating a pending packet entry 422 in retransmit queue 420 and appending the data to the queue (line 601). GRE module 320 then builds a header for the packet to be transmitted (line 602, see FIG. 7).

Referring to FIG. 6, after GRE module 320 builds the header, it passes the combined header and data to GRE Mux 330 (line 603). GRE Mux 330 then passes the packet (i.e., the combined header and data) to IP 250. ATO timer 450 is started if it is not already running for a previously transmitted packet, and the transmission time is recorded in the entry 422 in the retransmit queue. If ATO timer 450 is already running, then a previously sent packet has not yet been acknowledged or selectively acknowledged and the timer is set to expire at the end of the time interval allowed for receipt of an acknowledgment for the previously sent packet. In addition to setting the transmission time, GRE module 320 initializes the number of retries for the packet to zero in entry 422. GRE module 320 uses this counter of retries to determine when to "give up" on transmissions of this packet.

The procedure by which GRE module 320 constructs the header for an outbound packet, which is references on line 602 in FIG. 6, is illustrated in FIG. 7. If the packet is to have a data payload (that is, the packet is not being sent solely to transport an acknowledgment or a selective acknowledgment), then GRE module 320 records the sequence number of the packet in the sequence number field of the header (line 702).

If a done message has been queued, indicated by a true value of done_queued 476, then GRE module 320 records the sequence number stored in done 478 in the done field of the header. GRE module 320 then resets done_queued 476 (line 706) to indicate that the done message has been sent.

If a selective acknowledgment has been queued, indicated by a true value of sack_queued 472, and read queue 440 has remaining entries that have not yet been passed to PPP module 310 (line 708), then GRE module 320 records the sequence numbers of the packets in read queue 440 in the sack field of the header. Note that at the point that GRE module 320 is building a header, it has already delivered to PPP module 310 all in-sequence packets that can be delivered. The remaining packets in read queue 440 are packets that have been received with an intervening gap of packets that have not been received and for which done messages have not been received. After setting the sack field, GRE module 320 resets the sack_queued 472 flag (line 712).

If an acknowledgment is queued, indicated by a true value of ack_queued 470, then GRE module 320 records the sequence number stored in ack 474 in the header ack field (line 714). GRE module 320 then resets the ack_queued 470 flag (line 716).

3.2 Receiving Packet from GRE Mux 330 (FIGS. 8–13)

When GRE module 320 receives a packet from IP 250 via GRE Mux 330, it follows the procedure illustrated in FIG. 8. GRE module 320 first processes the received header (line 801) using a procedure shown in FIG. 9. One aspect of this processing relates to processing of acknowledgments piggybacked in the header of the received packet.

If the received packet includes a data payload (line 802) then GRE module 320 processes the payload (line 803) using a procedure shown in FIG. 10. Processing the payload includes passing data to PPP module 310, if possible, and queuing acknowledgments and selective acknowledgments to the received packets, if necessary. The packet may not include any data payload, for instance, if it was sent to carry an acknowledgment when there was no data packet on which to piggy-back the acknowledgment.

After processing the received header and the inbound payload data, if the received header includes a selective acknowledgment, GRE module 320 processes retransmit queue 420 (line 806) using a procedure shown in FIG. 11. If the received header includes an acknowledgment, GRE module 320 processes write queue 410 (line 809) using a procedure shown in FIG. 12. Then, GRE module 320 processes any remaining pending acknowledgements and selective acknowledgments (line 811) using a procedure shown in FIG. 13.

Turning to FIG. 9, processing a received header involves a series of steps. First, if the received header includes a "done" field (line 901), the sequence number of the done field (the done sequence number) is extracted. This done sequence number signifies the latest sequence number that will not be transmitted from the remote GRE module 320 again. If the local GRE module 320 has been waiting for receipt of a packet with the done sequence number before sending packets queued in read queue 440 to PPP module 440, it then sends any packets in read queue 440 with sequence numbers prior to or equal to the done sequence number to PPP module 310. These packets are removed from read queue 440 as they are sent to PPP module 310. GRE module 320 updates the value of ack 474 to be the done sequence number if that done sequence number is in fact later that the sequence number already stored in ack 474. GRE module 320 sets Ack_queued 470 to true indicating that an acknowledgment should be sent to the remote GRE module 320. If ack_queued 470 was not already set, indicating that no acknowledgment was already pending, then ack timer 460 is started with an expiration time based on the time the current packet was received.

Referring still to FIG. 9, if the received header includes a sack field (line 907), then the remote GRE module 320 has received a packet out of sequence, that is, it has received a packet with a gap of one or more missing packets. In response to the selective acknowledgment, GRE module 320 reduces cwnd 430, the size of the congestion window (line 908), for instance by reducing the window size by one if it is greater than one. Having received the sack message, GRE module 320 marks the selectively acknowledged packets in retransmit queue 420 so that they will not be retransmitted again by setting the retransmission counts of the sacked packets to the maximum value (lines 909–910). GRE module 320 queues a done message for transmission to the remote GRE module 320 by setting done_queued 476 to true.

If the received header includes an ack field (line 914), then the remote GRE module 320 has acknowledged that it no longer expects to receive any packets with sequence numbers prior to or equal to the ack value in the header. Note that the remote GRE module may be providing an acknowledgment in response to a done message rather than simply in response to correctly receiving a packet. Therefore, an acknowledgment does not necessarily mean that the remote GRE module has actually received the acknowledged packets.

In response to an ack message (i.e., a packet with an ack field in the header), GRE module 320 increases the size of the congestion window (line 915) by increasing cwnd 430 by one, unless the window size is already at a preset maximum size.

Next, since the remote GRE module 320 does not expect to receive transmission of packets with sequence numbers equal to or prior to the acknowledged sequence number, such packets are removed from local GRE module's retransmit queue 420 (lines 916–917). If the acknowledged sequence number is later than the current done 478 sequence number, the local GRE module 320 sets done 478 to the acknowledged sequence number (line 918). If the retransmit queue is empty (line 919) then GRE module 320 resets the done_queued 476 flag.

Referring back to FIG. 8, the next step after processing the received header (line 810) is to process the received payload (line 803) if there indeed is a payload. Referring to FIG. 10 processing the payload begins with discarding the payload (line 1002) if that packet has already been received. For instance, the remote GRE module may have retransmitted a packet even though the original transmission is successful. If the received packet is not a duplicate, then GRE module 320 inserts the packet into read queue 440 based on its sequence number (line 1004). If the inserted packet does not have the latest sequence number in the queue (i.e., the new packet fills a "hole" in the queued sequence of packets), then GRE module 320 sets ack queued 470 (line 1006) indicating that a new acknowledgment should be sent to the remote GRE module.

Referring still to FIG. 10, processing the received payload next involves looping over the earliest in-sequence packets in read queue 440 (line 1009). That is, the loop is over a series of packets with consecutive sequence numbers. Each of these packets is sent to PPP module 310 and removed from read queue 440 (line 1010). The ack 474 sequence number is incremented as the packets are sent to PPP module 310.

If there are any remaining packets in read queue 440, then there is a gap of sequence numbers and GRE module 320 sets sack_queued 472 (line 1016) so that it will send a selective acknowledgment to the remote GRE module.

Referring back to FIG. 8, the next step after processing the payload (line 803) is to process the retransmit queue 420 if the received header included a sack field (lines 805–807). Referring to FIG. 11 processing the retransmit queue involves looping over the oldest packets in retransmit queue 420, up to a maximum of cwnd 430 packets (line 1101). For each packet, if it has not already been retransmitted the maximum number of times and therefore is still a candidate for retransmission (line 1102), then GRE module 320 increments its count of retransmissions (line 1103), builds a header for the packet (line 1104) and sends the packet to GRE mux 330 (line 1105).

If GRE module 320 did not transmit any packets in the above loop (line 1107), for instance because all the packets in the congestion window had already reached their retry maximum, (either by having been retransmitted the maximum number of times or by having been sacked), then GRE module 320 sets done_queued 476. GRE module 320 builds a header (line 1109), which will include at least a done message, and sends a packet with no payload to the remote GRE module (line 1110).

Referring back to FIG. 8, the next step after processing the retransmit queue 420 (lines 805–807) is to process the write queue 410 (lines 808–810). Referring to FIG. 12, if the received packet contained an ack field and there are any pending packets in write queue 410 (line 1201), then GRE module 320 transmits at least one packet (line 1202) and moves the packet from the write queue to the retransmit queue. Then, if retransmit queue 422 can still accommodate more packets without exceeding the congestion window size, GRE module 320 transmits the next older packets in write queue 410 (line 1205).

If the retransmit queue 420 has less than one half the congestion window packets left in it, the GRE module 320 notifies PPP module 310 that it is no longer congested (line 1210).

Referring back to FIG. 8, the final step in processing a packet received from GRE Mux 330 is to process any pending acknowledgments or selective acknowledgments that have not already been piggy-backed on outbound packets (line 807). Referring to FIG. 13, if sack_queued 472 is set (line 1301) then GRE module 320 sends a packet to carry the pending selective acknowledgment. GRE module 320 builds a header (line 1302) and sends the packet (line 1303). Note that the header built at line 1302 may include an ack field if an acknowledgment was pending.

If an acknowledgment is still queued, indicated by ack_queued 474 still being set, and ack_queued 474 was set before the current packet was received (line 1305–1306) then a packet is sent to carry the acknowledgment (lines 1307–1308). In this way, an acknowledgment is sent at least whenever every other packet carrying a new payload is received from the remote GRE module. If an acknowledgment is queued but not sent, ack timer 460 is updated (line 1310) so that a maximum time will elapse before the acknowledgment is sent to the remote GRE module.

3.3 Processing Timer Expiration (FIGS. 14–15)

GRE module 320 also performs operations when ack timer 460 or ATO timer 450 expire. Referring to FIG. 14, when ack timer 460 expires, then GRE module 320 sends a packet to carry the pending acknowledgment. GRE module 320 sends the acknowledgment by building a header to carry the acknowledgment (line 1401) and then sending the packet with the header but no payload to GRE mux 330 (line 1402). GRE module 320 then reset ack timer 460 (line 1403).

Referring to FIG. 15, when ATO timer 450 expires, GRE module 320 first processes retransmit queue 420 using the procedure shown in FIG. 11 (line 1501). If no packets are transmitted in this processing of the retransmit queue, then GRE module 320 clears the retransmit queue.

GRE module 320 adapts the timeout periods for ATO timer 450 and ack timer 460 based on the timing of data transmissions through the GRE module. In particular, the ATO timeout period is adapted to be the average round-trip time (RTT) plus twice the average absolute deviations of RTTs from the average. The averages are maintained using a decaying average approach. GRE module 320 adapts the ack timeout period to be the maximum of (a) the average packet inter-transmission time plus the average absolute deviation of the inter-transmission times and (b) the average packet inter-arrival time plus the average absolute deviation of the inter-arrival times. This ack timeout is limited to a maximum preconfigured interval.

Figure 16:
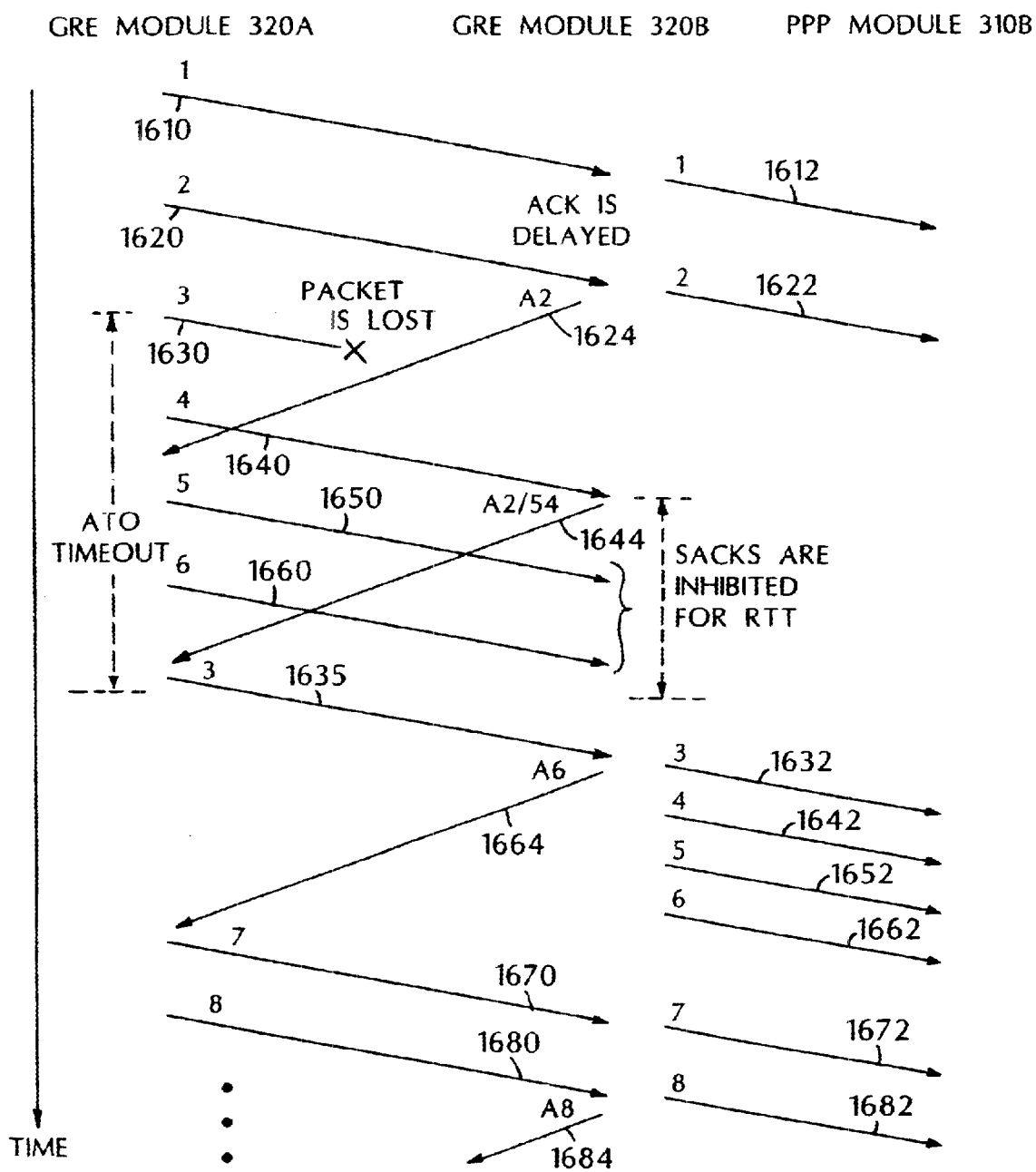
FIG. 16 illustrates an exemplary sequence of transmissions between two GRE modules.

3.4 Example (FIG. 16)

An example of communication between two GRE modules 320 is shown in FIG. 16. In the figure, time flows from the top of the figure to the bottom of the figure. The arrows illustrate packets passing between modules. From left to right, these modules are GRE module 320A on a first computer 100, GRE module 320B on a second computer 100, and PPP module 310B on the second computer. In this example, the congestion window, cwnd 430, is set to 4, and no data is pending transmission back from GRE module 320B to GRE module 320A.

Referring to FIG. 16, GRE module 320A sends packet 1 to GRE module 320B (1610). Since the packet is in sequence, when GRE module 320B receives the packet, it immediately sends it on to PPP module 310B (1612) and queues an acknowledgment. The acknowledgment is not immediately sent.

GRE module 320A then sends packet 2 (1620). GRE module 320B receives the packet and both forwards it to PPP module 310B (1622) and sends an acknowledgment packet including an ack=2 field in the header back to GRE module 320A (1624).

GRE module 320A sends packet 3 (1630). This packet is lost in transit to GRE module 320B.

GRE module 320A sends packet 4 (1640). When GRE module 320B received the packet, it recognizes that it is out of order. Therefore, it immediately sends back a packet. The header includes a selective ack field sack={4} and an ack=2 field. The received packet 4 is queued in read queue 440 and is not yet delivered to PPP module 330B.

After GRE module 320A sends packet 4, it has exhausted the congestion window of 4. After it receives acknowledgment of packet 2 (1624), GRE module 320A is free to send packets 5 and 6 (1650, 1660).

When GRE module 320B receives packets 5 and 6, it queues them in read queue 440. Selective acknowledgments are inhibited to be sent on their own (that is, piggy-backed on data packets) no more often than once every RTT interval. Therefore, no sacks are sent by GRE module 320B in response to receiving packets 5 and 6.

When GRE module 320A receives the selective acknowledgment of packet 4 (1644), it retransmits the missing packet 3 (1635). When GRE module 320B receives that packet, it is then free to send packets 3 through 6 to PPP module 310B (1632, 16423, 1652, 1662). Then GRE module 320B sends an acknowledgment of packet 6 to GRE module 320A (1664).

When GRE module 320A receives the acknowledgment of packet 6 (1664), it is free to send packets 7 through 10 to fill the congestion window.

If for some reason, GRE module 320A had not received the selective ack of packet 4 (1644), then packet 3 would have been retransmitted at the expiration of the ATO timer which was started when packet 3 was transmitted.

Alternative embodiments of the invention implement semi-reliable protocols at communication layers other than the transport layer. For instance, essentially the same semi-reliable communication approach is used at a network or data link layer, or at an application layer.

Alternative embodiments of the invention use somewhat different approaches to achieving semi-reliable data delivery. For instance, when a sending module "gives up" on getting an acknowledgment of particular packet, it can send a packet to carry the "done message" (the message "I will no longer try to send packet X") rather than setting a field in the header of another transmitted packet. Other equivalent ways of notifying the receiving module that the transmitting module has given up can also be used. Also, rather than the transmitting module giving up on receiving an acknowledgment that the receiving module has received a particular packet, the receiving module can send back an message indicating that it is giving up (i.e., "I no longer care if I receive packet X"). For instance, the receiving module can base its decision to give up based on the timing of received packets, for instance based on expiration of a timeout period. A combination of the transmitting module and the receiving module giving up can also be used.

The described communication approach can be used on other types of data networks. For instance, an IPX-based data network can be used. Other stateless and potentially lossy network protocols can also be used. The approach can also be used on a lossy point-to-point circuit, for instance on a lossy ATM-based circuit, to provide a semi-reliable delivery of data packets.

The approach to semi-reliable delivery of data can also be applied to situations in which data "ages" if it not delivered in time. For instance, in sending a stream of video frames over a data network, the sender can send a message to explicitly indicate that it will no longer try to send a packet is not expected to reach the receiver in time. Also, the receiver can send a message to indicate that it is no longer interested in receiving a packet (or a range of packets) because it can no longer use them.

The described system uses software implementations of the communication protocols that execute on a general purpose processor. Alternative embodiments can be partially or completely implemented in hardware or using dedicated control processors. For example, the GRE module can be implemented using dedicated hardware that is part of a network interface.

It is to be understood that the foregoing description is intended to illustrate and not to limit the scope of the invention, which is defined by the scope of the appended claims. Other embodiments are within the scope of the following claims.

What is claimed is:

1. A method for communicating between a first software module on a first computer and a second software module on a second computer over a data channel comprising:

establishing a communication session coupling the first software module and the second software module over the data channel;

sending outbound data from the first software module to the second software module over the communication session, including transmitting a first packet that includes the outbound data from the first computer to the second computer, prior to receiving an indication from the second computer that the first packet was successfully received, transmitting a second packet that includes the outbound data from the first computer to the second computer, and prior to receiving an indication from the second computer that the second packet was successfully received, transmitting a third packet that includes an indication that the outbound data will not be further transmitted from the first computer to the second computer.

2. The method of claim 1 wherein the communication session is a transport layer communication session over a data network.

3. The method of claim 2 wherein the first software module and the second software module implement a network layer protocol and the outbound data sent over the transport layer communication session includes network layer communication.

4. The method of claim 1 further comprising after transmitting the second packet and prior to transmitting the third packet transmitting at least one additional packet from the first computer to the second computer that includes the outbound data.

5. The method of claim 1 further comprising:
receiving inbound data at the first software module over the communication session from the second software module, including
receiving a first packet from the second computer that includes the inbound data,
buffering the inbound data,
waiting for receipt of a packet from the second computer that includes prior inbound data that was sent by the second computer prior to sending the inbound data,
receiving a second packet from the second computer that includes an indication that prior inbound data will not be retransmitted by the second computer, and
providing the inbound data to the first software module.

6. The method of claim 1 further comprising processing raw outbound data using a state-dependent data processing algorithm to produce the outbound data wherein data processing of the raw outbound data depends on data that was processed to produce previously sent outbound data.

7. A method for passing data over a data channel from a source to a destination comprising:
transmitting a first data packet from the source to the destination;
retransmitting the first data packet from the source to the destination;
sending from the source to the destination an indication that the first data packet will not be further retransmitted.

8. The method of claim 7 further comprising retransmitting the first data packet from the source to the destination at least once more prior to sending the indication that said packet will not be retransmitted.

9. The method of claim 7 wherein sending the indication that the first data packet will not be further retransmitted includes transmitting a second data packet from the source to the destination, the second data packet including the indication that the first data packet will not be further retransmitted.

10. The method of claim 7 further comprising:
subsequent to transmitting the first data packet, transmitting a second data packet from the source to the destination; and
prior to retransmitting the first data packet, accepting an indication that the second data packet was received at the destination prior to the first data packet being received at the destination.

11. A method for passing data over a data channel from a source to a destination comprising:
receiving a first packet from the source that includes the data;
buffering the data;
waiting for receipt of a packet from the source that includes prior data that was sent by the source prior to sending the data;
receiving a second packet from the source that includes an indication that prior data will not be retransmitted by the source; and
providing the inbound data to the destination.

12. The method of claim 7 further comprising accepting from the destination an indication that further retransmission of the first packet is not required by the destination.

13. A data communication module for passing data between a first computer and a second computer over a data channel, the communication module comprising:
a retransmission storage for holding information related to a plurality of packets previously transmitted from the first computer to the second computer, the storage related to each of the packets including a retransmission counter used to determine whether the packet is a candidate for retransmission to the second computer and that is updated when the packet is retransmitted;
a retransmitter coupled to the retransmission storage for processing packets, including retransmitting a packet to the second computer if its associated retransmission counter indicates that the packet is a candidate for retransmission, and for sending an indication that a packet associated with the retransmission storage will not be retransmitted.

14. Software stored on a computer-readable medium comprising instructions for causing a computer to perform functions comprising:
establishing a communication session coupling a first software module and a second software module over the data channel;
sending outbound data from the first software module to the second software module over the communication session, including
transmitting a first packet that includes the outbound data from the first computer to the second computer,
prior to receiving an indication from the second computer that the first packet was successfully received, transmitting a second packet that includes the outbound data from the first computer to the second computer, and
prior to receiving an indication from the second computer that the second packet was successfully received, transmitting a third packet that includes an indication that the outbound data will not be further transmitted from the first computer to the second computer.

15. Software stored on a computer-readable medium comprising instructions for causing a computer to perform functions comprising:
transmitting a first data packet from a source to a destination over a data channel;
retransmitting the first data packet from the source to the destination;
sending from the source to the destination an indication that the first data packet will not be further retransmitted.

16. The software of claim 14 wherein the communication session is a transport layer communication session over a data network.

17. The software of claim 16 wherein the first software module and the second software module implement a network layer protocol and the outbound data sent over the transport layer communication session includes network layer communication.

18. The software of claim 14 wherein the functions further comprise after transmitting the second packet and prior to transmitting the third packet transmitting at least one additional packet from the first computer to the second computer that includes the outbound data.

19. The software of claim 14 wherein the functions further comprise;
  receiving inbound data at the first software module over the communication session from the second software module, including
    receiving a first packet from the second computer that includes the inbound data,
    buffering the inbound data,
    waiting for receipt of a packet from the second computer that includes prior inbound data that was sent by the second computer prior to sending the inbound data,
    receiving a second packet from the second computer that includes an indication that prior inbound data will not be retransmitted by the second computer, and
    providing the inbound data to the first software module.

20. The software of claim 14 wherein the functions further comprise processing raw outbound data using a state-dependent data processing algorithm to produce the outbound data wherein data processing of the raw outbound data depends on data that was processed to produce previously sent outbound data.

21. The software of claim 15 wherein the functions further comprise retransmitting the first data packet from the source to the destination at least once more prior to sending the indication that said packet will not be retanstted.

22. The software of claim 15 wherein sending the indication that the first data packet will not be further retransmitted includes transmitting a second data packet from the source to the destination, the second data packet including the indication that the first data packet will not be further retransmitted.

23. The software of claim 15 wherein the functions further comprise:
  subsequent to transmitting the first data packet, transmitting a second data packet from the source to the destination; and
  prior to retransmitting the first data packet, accepting an indication that the second data packet was received at the destination prior to the first data packet being received at the destination.

24. The software of claim 15 wherein the fictions further comprise accepting from the destination an indication that further retransmission of the first packet is not required by the destination.

25. Software stored on a computer readable medium comprising instructions for causing a computer to perform functions comprising:
  receiving a first packet from he source that includes the data;
  buffering the data;
  waiting for receipt of a packet from the source that includes prior data that was sent by the source prior to sending the data;
  receiving a second packet from the source that includes an indication that prior data will not be retransmitted by the source; and
  providing the inbound data to the destination.

* * * * *